(12) United States Patent
Faibish et al.

(10) Patent No.: US 9,305,010 B1
(45) Date of Patent: Apr. 5, 2016

(54) VIRTUAL FILE SYSTEM PROVIDING INTERFACE BETWEEN ANALYTICS PLATFORM AND PHYSICAL FILE SYSTEM

(71) Applicant: EMC Corporation, Hopkinton, MA (US)

(72) Inventors: Sorin Faibish, Newton, MA (US); John M. Bent, Los Alamos, NM (US); George Tuma, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 207 days.

(21) Appl. No.: 14/143,863

(22) Filed: Dec. 30, 2013

(51) Int. Cl.
*G06F 17/30* (2006.01)

(52) U.S. Cl.
CPC .... *G06F 17/30174* (2013.01); *G06F 17/30218* (2013.01); *G06F 17/30233* (2013.01)

(58) Field of Classification Search
None
See application file for complete search history.

(56) References Cited

U.S. PATENT DOCUMENTS

| | | | | |
|---|---|---|---|---|
| 8,209,274 B1* | 6/2012 | Lin | ........................ | G06N 3/08 706/21 |
| 9,098,803 B1* | 8/2015 | Todd | ........................ | G06N 5/02 |
| 2011/0161325 A1* | 6/2011 | Jones | ................... | G06F 17/3089 707/741 |
| 2011/0225584 A1* | 9/2011 | Andrade | ................... | G06F 9/50 718/100 |
| 2012/0198369 A1* | 8/2012 | Sorin | ..................... | G06Q 10/10 715/763 |
| 2013/0159364 A1* | 6/2013 | Grider | ............... | G06F 17/30224 707/826 |
| 2013/0185147 A1* | 7/2013 | Letca | .................. | G06Q 30/0241 705/14.47 |
| 2014/0189536 A1* | 7/2014 | Lange | ..................... | H04L 67/22 715/753 |
| 2014/0245443 A1* | 8/2014 | Chakraborty | ....... | H04L 63/1425 726/23 |
| 2015/0032886 A1* | 1/2015 | Wang | .................. | G06F 11/3006 709/224 |

OTHER PUBLICATIONS

J. Bent et al., "PLFS: A Checkpoint Filesystem for Parallel Applications," ACM Proceedings of the Conference on High Performance Computing Networking, Storage and Analysis (SC09), Nov. 2009, pp. 1-12.
Cluster File Systems, Inc., "Lustre: A Scalable, High-Performance File System," Nov. 2002, pp. 1-13.
F. Wang et al., "Understanding Lustre Filesystem Internals," National Center for Computational Sciences, Tech Report ORNL/TM-2009/117, Apr. 2009, pp. 1-80.

* cited by examiner

*Primary Examiner* — Wilson Lee
(74) *Attorney, Agent, or Firm* — Ryan, Mason & Lewis, LLP (57) ABSTRACT

A virtual file system is arranged between a physical file system and an analytics platform comprising a plurality of compute nodes, and is configured to control movement of data between the analytics platform and the physical file system. For example, the virtual file system may be configured to present to the analytics platform a software application programming interface (API) through which the analytics platform accesses data stored in the physical file system. The analytics platform illustratively comprises a unified analytics platform that is configurable to support both database analytics and map-reduce analytics. In some embodiments, the physical file system comprises one or more of a Lustre file system, a Hadoop Distributed File System (HDFS) and a General Parallel File System (GPFS), and the virtual file system comprises a parallel log-structured file system (PLFS).

20 Claims, 6 Drawing Sheets

VIRTUAL FILE SYSTEM PROVIDING INTERFACE BETWEEN ANALYTICS PLATFORM AND PHYSICAL FILE SYSTEM

FIELD

The field relates generally to information processing systems, and more particularly to information processing systems that incorporate cluster file systems.

BACKGROUND

It is common in high-performance computing (HPC) systems and other information processing systems for multiple compute nodes to access a cluster file system. For example, HPC systems such as supercomputers typically include large numbers of compute nodes that access a parallel file system, distributed file system or other type of cluster file system. A cluster file system as the term is broadly used herein generally allows multiple compute nodes or other types of clients to share access to files over a network.

One well-known cluster file system is the Lustre file system. Lustre is a Linux-based high performance cluster file system utilized for computer clusters ranging in size from small workgroup clusters to large-scale, multi-site clusters. Lustre can readily scale to support tens of thousands of clients, petabytes of storage capacity, and hundreds of gigabytes per second of aggregate input-output (IO) throughput. Due to its high performance and scalability, Lustre is utilized in many supercomputers, as well as other complex computing environments, including large enterprise data centers.

In conventional Lustre implementations, it can be difficult to balance the conflicting requirements of storage capacity and IO throughput. IO operations on object storage servers are generally performed directly with back-end storage arrays associated with those servers, and the corresponding storage devices may not be well matched to the current needs of the system. This can lead to situations in which either performance is less than optimal or the costs of implementing the system become excessive.

For example, certain types of highly cost effective storage, such as scale-out network attached storage, are often seen as failing to provide performance characteristics that are adequate for use with supercomputers and other complex computing environments that utilize Lustre file systems.

Also, it can be difficult to integrate Lustre file systems and other types of cluster file systems with analytics platforms, such as analytics platforms utilized to implement "Big Data" analytics functionality involving complex data sources.

SUMMARY

Illustrative embodiments of the present invention provide cluster file systems that implement a virtual file system configured to provide an interface between an underlying physical file system and an associated analytics platform. The virtual file system is utilized to control movement of data between the analytics platform and the physical file system, so as to provide significant improvements relative to conventional arrangements. For example, one or more of the illustrative embodiments are configured so as to allow an analytics platform supporting at least one of database analytics and map-reduce analytics to access an underlying physical file system implemented using a Lustre file system, or other additional or alternative file systems, at least some of which utilize scale-out network attached storage.

In one embodiment, a virtual file system is arranged between a physical file system and an analytics platform comprising a plurality of compute nodes, and is configured to control movement of data between the analytics platform and the physical file system. For example, the virtual file system may be configured to present to the analytics platform a software application programming interface (API) through which the analytics platform accesses data stored in the physical file system.

By way of example, the analytics platform illustratively comprises a unified analytics platform that is operative in a first configuration to perform database analytics and operative in a second configuration to perform map-reduce analytics.

In some embodiments, the physical file system comprises one or more of a Lustre file system, a Hadoop Distributed File System (HDFS) and a General Parallel File System (GPFS), and the virtual file system comprises a parallel log-structured file system (PLFS).

As noted above, illustrative embodiments described herein provide significant improvements relative to conventional arrangements. In some of these embodiments, integration of an analytics platform with an underlying physical file system is considerably facilitated. For example, the virtual file system can permit analytics platforms that would otherwise require multiple distinct underlying physical file systems to support respective database and map-reduce analytics to instead operate using a unified framework and possibly a single common underlying physical file system. Numerous other advantages relative to conventional arrangements are also provided.

Other embodiments include without limitation methods, apparatus, systems, and articles of manufacture comprising processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising private and public cloud computing or storage systems, as well as other types of processing systems comprising physical or virtual processing resources in any combination.

Figure 1:
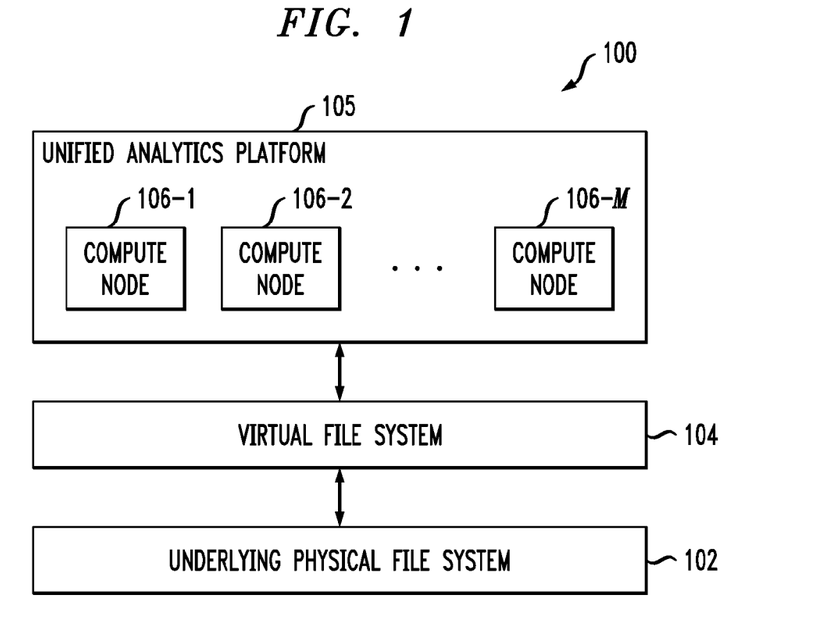
FIG. 1 is a block diagram of an information processing system comprising a virtual file system arranged between a unified analytics platform and a physical file system in an illustrative embodiment of the invention.

FIG. 1 shows an information processing system 100 configured in accordance with an illustrative embodiment of the present invention. The information processing system 100 comprises a physical file system 102, a virtual file system 104 and a unified analytics platform 105 comprising a plurality of compute nodes 106-1, 106-2, . . . 106-M. The physical file system 102 is also referred to as an "underlying" physical file system as it underlies and stores data for the analytics platform 105.

The virtual file system 104 is arranged between the unified analytics platform 105 and the physical file system 102, and is configured to control movement of data between the analytics platform and the physical file system. For example, the virtual file system 104 is illustratively configured to present a software API to the analytics platform 105 through which the analytics platform accesses data stored in the physical file system.

The virtual file system 104 in the present embodiment is assumed to be implemented as a parallel log-structured file system (PLFS), although other types of virtual file systems may be used in other embodiments. Additional details regarding PLFS can be found in J. Bent et al., "PLFS: A Checkpoint Filesystem for Parallel Applications," ACM/IEEE Conference on High Performance Computing Networking, Storage and Analysis, SC09, Portland, Oreg., Nov. 14-20, 2009, pp. 1-12, which is incorporated by reference herein. It is to be appreciated, however, that use of PLFS is not a requirement in other embodiments.

The analytics platform 105 in the present embodiment is referred to as a unified analytics platform in that it is assumed to be able to support both database analytics and map-reduce analytics using the underlying physical file system 102.

By way of example, the analytics platform 105 may be implemented at least in part utilizing products such as Greenplum® database (GPDB) and Pivotal HD™. The latter analytics platform product utilizes an architecture referred to as HAWQ™. The Pivotal HD™ product using the HAWQ™ architecture may be viewed as an integration of a Greenplum® massively parallel processing (MPP) analytics database platform and Apache Hadoop, an open-source Big Data platform. These products are exemplary only, and other types of analytics platforms may be used in other embodiments.

The physical file system 102 illustratively comprises a plurality of storage tiers and the virtual file system 104 controls movement of data between the storage tiers. The plurality of storage tiers may include at least one tier of flash storage devices and at least one tier of disk storage devices.

For example, in some embodiments, the physical file system 102 is implemented using a Lustre file system comprising multiple object storage servers or OSSs and one or more metadata servers or MDSs. The OSSs are associated with respective object storage targets or OSTs and are illustratively arranged in multiple storage tiers. The multiple OSS tiers in such an arrangement may be supplemented by at least one burst buffer tier implemented utilizing one or more burst buffer appliances.

Conventional aspects of Lustre file systems are described in, for example, Cluster File Systems, Inc., "Lustre: A Scalable, High-Performance File System," November 2002, pp. 1-13, and F. Wang et al., "Understanding Lustre Filesystem Internals," Tech Report ORNL/TM-2009/117, April 2010, pp. 1-95, which are incorporated by reference herein.

The multiple OSS storage tiers may include at least first and second storage tiers comprising respective disjoint subsets of a plurality of OSSs, with the OSSs in the first storage tier being configured to interface with OSTs of a first type and the OSSs in the second storage tier being configured to interface with OSTs of a second type different than the first type. The first and second different types of OSTs provide respective different levels of performance, as in an arrangement in which the OSTs of the first type comprise respective flash storage devices and the OSTs of the second type comprise respective disk storage devices.

The flash storage devices of the first storage tier are generally significantly faster in terms of read and write access times than the disk storage devices of the second storage tier. The flash storage devices are therefore considered "fast" devices in this embodiment relative to the "slow" disk storage devices. Accordingly, the physical file system 102 may be characterized as having a "fast" storage tier and a "slow" storage tier, where "fast" and "slow" in this context are relative terms and not intended to denote any particular absolute performance level. However, numerous alternative tiering arrangements may be used, including arrangements with three or more tiers each providing a different level of performance. The particular storage devices used in a given storage tier may be varied in other embodiments, and multiple distinct storage device types may be used within a single storage tier.

The flash storage devices may be implemented, by way of example, using respective flash Peripheral Component Interconnect Express (PCIe) cards or other types of memory cards installed in a computer or other processing device. Numerous alternative arrangements are possible. Also, a variety of other types of non-volatile or volatile memory in any combination may be used in place of the flash storage devices. Examples of alternatives to flash storage devices that may be used as respective object storage targets in other embodiments of the invention include non-volatile memories such as magnetic random access memory (MRAM) and phase change random access memory (PC-RAM).

The flash storage devices of the first storage tier generally provide higher performance than the disk storage devices of the second storage tier but the disk storage devices generally provide higher capacity at lower cost than the flash storage devices. The exemplary tiering arrangement therefore makes it possible to dynamically balance the conflicting requirements of storage capacity and IO throughput, thereby avoiding situations in which either performance is less than optimal or the costs of implementing the system become excessive. Arrangements of this type can provide further acceleration of IO operations in system 100, leading to enhanced system performance relative to conventional arrangements, while additionally or alternatively providing an ability to achieve particular levels of performance at lower cost.

Again, these particular tiering arrangements should be considered exemplary only, and numerous alternative arrangements of two or more storage tiers may be utilized in providing at least a portion of the physical file system 102 in other embodiments.

For example, the use of Lustre OSSs is not a requirement, and numerous other file systems can be used in the physical file system 102. Alternative object stores that can be used include Ceph, as well as other types of object stores. Such object stores can use a variety of other arrangements of object storage elements, and are not limited to utilization of object storage servers. It is also possible in other embodiments to implement at least portions of the physical file system 102 using other types of file systems, such as, for example, Hadoop Distributed File System (HDFS) or General Parallel File System (GPFS), or using various combinations of these and other file systems.

In the present embodiment, the physical file system 102 and the virtual file system 104 collectively provide an exemplary implementation of what is more generally referred to herein as a cluster file system. As indicated above, portions of a cluster file system may be implemented as a distributed file system such as HDFS, a parallel file system such as GPFS or as a combination of a Lustre file system with RDFS, GPFS or other parallel or distributed file systems. The term "cluster file system" as used herein is therefore intended to be broadly construed, so as to encompass, for example, Lustre file systems, distributed file systems, parallel file systems, or various combinations thereof; as well as other types of file systems implemented using one or more clusters of processing devices.

At least portions of the physical file system 102 can be implemented using one or more storage arrays. Such storage arrays may comprise, for example, storage products such as VNX® and Symmetrix VMAX®, both commercially available from EMC Corporation of Hopkinton, Mass. A variety of other storage products may be utilized to implement the physical file system 102.

A given burst buffer appliance implemented in the physical file system 102 is generally configured to accelerate IO operations between the compute nodes 106 and back-end storage arrays or other storage devices of the physical file system storing associated data in its burst buffers.

Accordingly, the term "burst buffer appliance" as used herein is intended to be broadly construed, so as to encompass any network appliance or other arrangement of hardware and associated software or firmware that collectively provides multiple burst buffers implemented using high-speed storage devices. Thus, such an appliance generally provides a high-speed memory that serves as a buffer between the compute nodes 106 of the analytics platform 105 and lower-speed storage devices, for storing bursts of data associated with different types of JO operations.

Other embodiments may include multiple burst buffer appliances, with each such appliance adapted for coupling between at least a portion of the physical file system 102 and one or more compute nodes 106 of the analytics platform 105.

As mentioned previously, the virtual file system 104 in the FIG. 1 embodiment is illustratively arranged between the physical file system 102 and the analytics platform 105. The virtual file system 104 is more particularly configured to provide an interface between the physical file system 102 and a plurality of clients illustratively comprising respective ones of the compute nodes 106 or various components thereof. The term "client" as used herein is therefore intended to be broadly construed, so as to encompass, for example, a compute node or a component thereof. Such a component may be implemented in software, and therefore a "client" as the term is utilized herein may comprise a software component associated with one of the compute nodes 106 of the analytics platform 105. For example, a client may comprise an application running on a given one of the compute nodes 106.

Although illustratively shown as being implemented externally to the analytics platform 105 in the present embodiment, the virtual file system 104 in other embodiments may be implemented at least in part on the compute nodes 106. For example, the virtual file system 104 may be implemented at least in part utilizing software running on the compute nodes 106. In embodiments such as that of FIG. 1 in which the virtual file system 104 is assumed to be implemented using PLFS, such software may more particularly comprise PLFS clients running on respective ones of the compute nodes 106.

Numerous other types and arrangements of physical file systems, virtual file systems and analytics platforms may be used in other embodiments of the invention. Although some embodiments utilize one or more burst buffer appliances in the physical file system 102, use of burst buffer appliances is optional and may be eliminated in other embodiments.

As indicated above, the virtual file system 104 is utilized to control movement of objects and other data between storage tiers of the physical file system 102, and such movement may take into account current operating conditions and other factors.

Data movement determinations made by the virtual file system 104 are illustratively performed in cooperation with one or more job schedulers of the information processing system 100. For example, data movement determinations can be made at least in part utilizing a job scheduler of the system 100 responsive to IO requests received in the job scheduler from one or more applications running on the compute nodes 106. Such IO requests and other similar requests referred to herein may be configured, for example, in accordance with standard portable operating system interface (POSIX) system calls. Data movement determinations can be implemented differently for each of a plurality of processing jobs, thereby effectively allowing dynamic data migration on a per-job basis.

In conjunction with movement of data between the storage tiers of the physical file system 102, the virtual file system 104 updates associated metadata that characterizes the current location and distribution of the data in the tiers of the physical file system 102. It is to be appreciated, however, that use of storage tiering is not a requirement, and some embodiments can therefore include only a single storage tier in the physical file system 102.

Communications between the various elements of system 100 may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

At least portions of the physical file system 102, the virtual file system 104, and the analytics platform 105 comprising compute nodes 106 may be implemented using one or more processing platforms, examples of which will be described in greater detail below in conjunction with FIGS. 7 and 8. A given such processing platform comprises at least one processing device comprising a processor coupled to a memory, and the processing device may be implemented at least in part utilizing one or more virtual machines.

Although shown in FIG. 1 as being separate from the physical file system 102 and compute nodes 106, the virtual file system 104 in other embodiments may be implemented at least in part within one or more of these system elements. It is also to be appreciated that a given embodiment of the information processing system 100 may include multiple instances of one or more of the physical file system 102, the virtual file system 104 and the set of M compute nodes 106, although only a single instance of each of these elements is shown in the system diagram for clarity and simplicity of illustration.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in greater detail with reference to the flow diagram of FIG. 2. The process as shown includes steps 200 through 204, and is suitable for use in the system 100 but is more generally applicable to other systems comprising a virtual file system providing an interface between a physical file system and an analytics platform.

In step 200, a virtual file system is configured for coupling between a physical file system and an analytics platform comprising multiple compute nodes. With reference to the FIG. 1 embodiment, the virtual file system 104 is implemented between the physical file system 102 and the analytics platform 105 comprising compute nodes 106. In other embodiments, the virtual file system may be implemented at least in part on the compute nodes 106 themselves, for example, using PLFS clients running on respective ones of the compute nodes. Instead of or in addition to PLFS clients, other clients may be implemented at least in part utilizing an IO forwarding scalability layer (IOFSL).

In step 202, the virtual file system is adapted for communication with the analytics platform. In the FIG. 1 embodiment, the virtual file system 104 is adapted, for example, to present a software API to the analytics platform 105 through which the analytics platform can access data stored in the physical file system 102.

In step 204, the virtual file system 104 is utilized to control movement of data between the analytics platform and the physical file system. In the FIG. 1 embodiment, the virtual file system 104 not only controls movement of data between the analytics platform 105 and the physical file system 102, it also controls movement of data between multiple storage tiers of the physical file system 102.

The data movement control provided by the virtual file system 104 may involve transforming data files utilized by the analytics platform 105 into data objects for storage in the physical file system 102. For example, multiple data files may be associated with a single data object.

As noted above, the virtual file system 104 may be implemented using PLFS and in such an embodiment transforming the data files into data objects may comprise associating multiple ones of the data files with a single PLFS object. Such PLFS objects are also referred to herein as "containers."

In transforming data files into objects, a given object is identified by an object identifier, also referred to herein as an object ID. For example, data objects may be configured in a manner compliant with the T10 Object Storage Device (OSD) standard, although other types of data objects can be used. An object ID may comprise or have associated therewith additional related information such as an object server ID, an object server IP address, a PLFS container ID, a compute node ID, an index ID and a data pointer, although numerous additional or alternative fields may be used.

Metadata files corresponding to the transformed data files may also be transformed into metadata objects for storage in the physical file system 102. The metadata object associated with one or more data objects includes information indicating for each of the objects its corresponding location in the physical file system 102. This information may be supplemented by additional metadata characterizing the storage of the data objects in the physical file system.

It should be noted in this context that the term "metadata file" as used herein is intended to be broadly construed, and may comprise information such as directory information, data pointers or other types of information indicative of the manner in which data files are stored as objects within the physical file system 102.

In the FIG. 1 embodiment, such storage is performed in under the control of the virtual file system 104. The virtual file system 104 may present a file-based interface to clients associated with compute nodes 106. Thus, for example, certain clients running on the compute nodes 106 can write and read data files as if the data files are stored as respective separate files in a physical file system, with the virtual file system 104 providing transformation between files and objects as necessary.

As a more particular example, in an embodiment in which the virtual file system 104 is implemented using PLFS running on the compute nodes, PLFS clients on those nodes can perform at least a portion of the transformation between files and objects such that other clients running on the compute nodes see a file-based interface. It should therefore be understood that references herein to presentation of a file-based interface to clients are intended to encompass arrangements in which some clients running on the compute nodes 106 see such an interface while other clients on the compute nodes, such as the above-noted PLFS clients, are involved in providing the file-based interface. The clients that see the file-based interface illustratively comprise applications running on the compute nodes 106.

It was noted above that data stored in the physical file system 102 may be migrated between multiple storage tiers as necessary to facilitate achievement of desired performance levels. For example, in the FIG. 1 embodiment, the virtual file system 104 may migrate objects between multiple storage tiers of the physical file system 102 in order to achieve desired levels of IO performance responsive to requests received from one or more clients. Object migration and other data movement determinations may be based at least in part on monitoring of current levels of performance within the system 100. Such monitoring in the FIG. 1 embodiment is assumed to be performed under the direction of the virtual file system 104 and may involve the use of sensors of a sensor network, or various other types of monitoring arrangements. The particular types of operating conditions and other factors that are monitored can be varied depending upon the needs of a given implementation.

The movement of a given one of the objects between first and second storage tiers may be controlled at least in part based on information provided by a client comprising an application running on a corresponding compute node.

In some embodiments, multiple data files associated with a given one of the objects moved from a first storage tier to a second storage tier can be made directly accessible within the second storage tier by a corresponding one of the clients without requiring interaction between the client and the first storage tier.

When PLFS is used to implement the virtual file system 104, the virtual file system may comprise PLFS middleware including multiple synchronization daemons associated with respective storage nodes of the physical file system 102. A given such synchronization daemon is triggered by at least one of a read operation and a write operation associated with a client comprising an application running on a corresponding compute node.

The use of PLFS facilitates efficient movement of data between the storage tiers in a manner that is at least in part responsive to applications running on compute nodes 106 of the analytics platform 105. The term "data movement" as used herein is intended to be broadly construed, so as to encompass data migration as well as other types of movement of data between storage tiers.

If the desired levels of performance have not been achieved, the manner in which the objects or other data are stored across the storage tiers of the physical file system 102 can be altered. In the context of the FIG. 1 embodiment, this generally involves the virtual file system 104 determining and implementing an alternative storage arrangement, different than the current storage arrangement, so as to facilitate achievement of the desired levels of performance in the system 100.

If the desired levels have been achieved, the process simply continues to process files received from the clients. The above-noted determination as to whether or not desired levels of performance have been achieved is then repeated periodically and further adjustment of the manner in which the objects or other data distributed over the storage tiers is made as needed, possibly in response to changing operating conditions and other factors.

Figure 2:
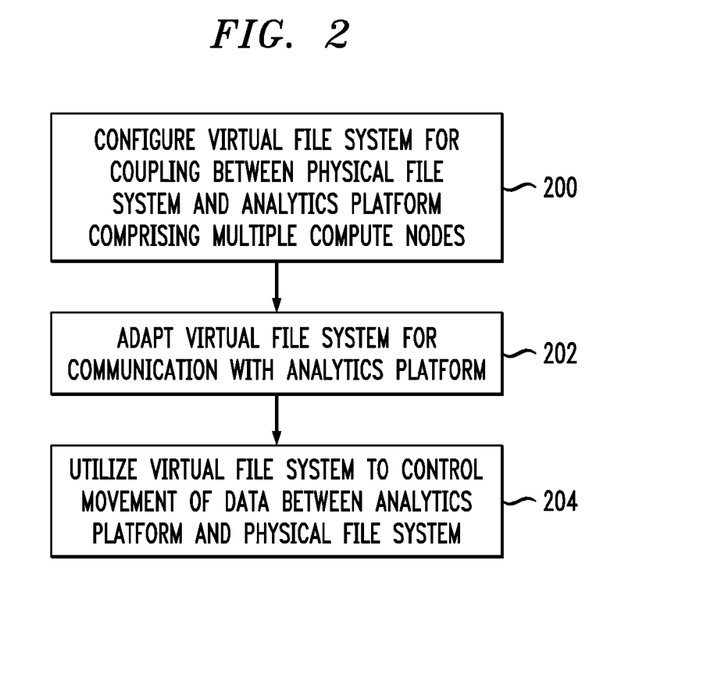
FIG. 2 is a flow diagram of an exemplary process implemented using the virtual file system in the information processing system of FIG. 1.

The particular processing operations and other system functionality described in conjunction with the flow diagram of FIG. 2 are presented by way of illustrative example only, and should not be construed as limiting the scope of the invention in any way. Alternative embodiments can use other types of processing operations using a virtual file system to control storage of data in an underlying physical file system. For example, the ordering of the process steps may be varied in other embodiments, or certain steps may be performed concurrently with one another rather than serially. Also, one or more of the process steps may be repeated periodically for different processing applications, or performed in parallel with one another.

It is to be appreciated that functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Additional embodiments of the invention will now be described in more detail with reference to FIGS. 3 through 5. Each of these figures shows a more detailed view of a corresponding information processing system embodiment that comprises a virtual file system arranged between an analytics platform and a physical file system.

Figure 3:
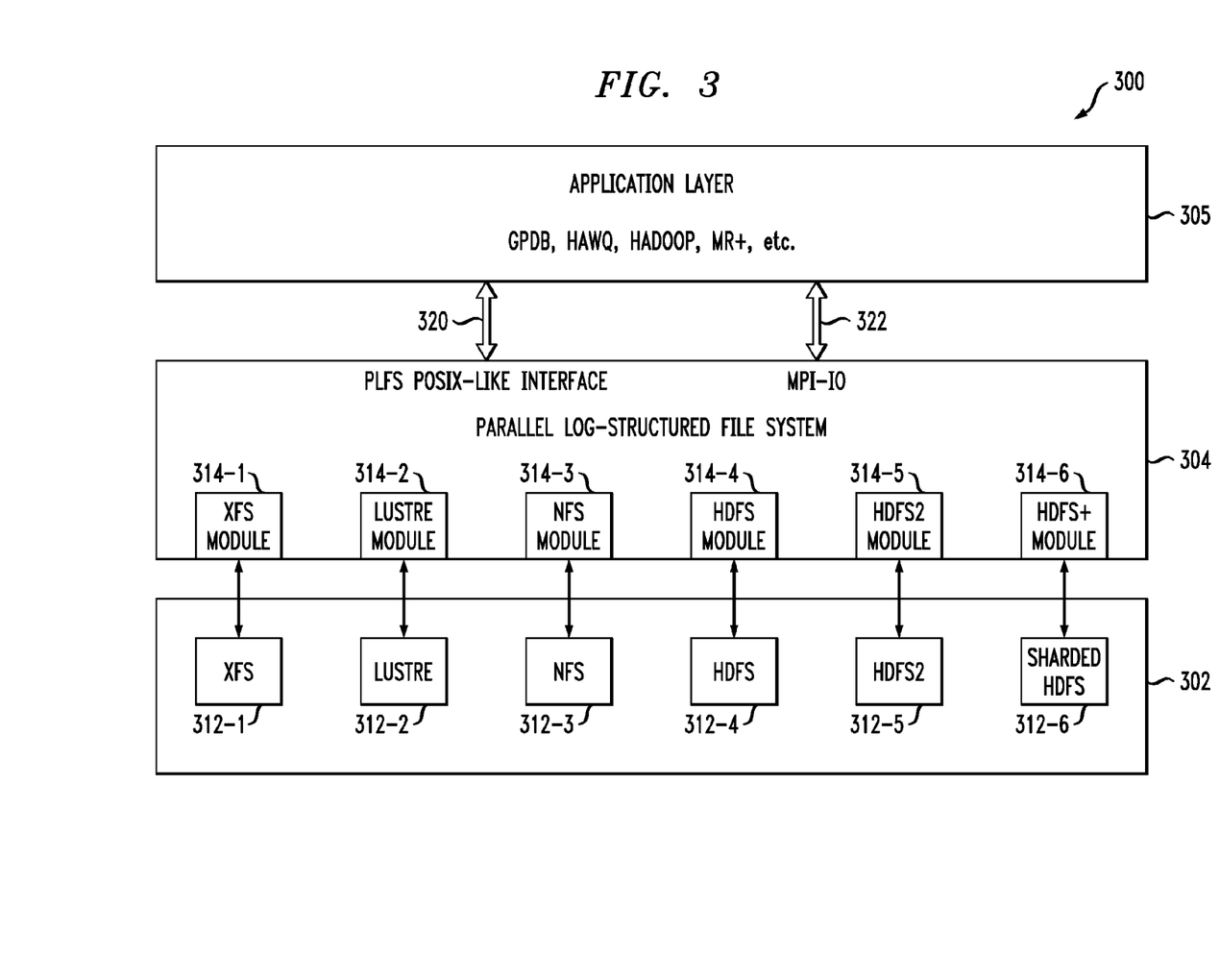
FIGS. 3, 4 and 5 show respective other embodiments of information processing systems each comprising a virtual file system arranged between an analytics platform and a physical file system.

Referring initially to FIG. 3, an information processing system 300 comprises a physical file system 302, a virtual file system 304 and an analytics platform 305. The analytics platform 305 is more particularly implemented as an application layer that runs on underlying compute nodes that are not explicitly shown in this figure. The application layer implements application functionality associated with one or more of GPDB, HAWQ™, Hadoop, MR+ and possibly others. The physical file system 312 in this embodiment includes multiple distinct file systems arranged in parallel with one another, including XFS 312-1, Lustre 312-2, Network File System (NFS) 312-3, HDFS 312-4, HDFS2 312-5 and sharded HDFS 312-6.

The virtual file system 304 is implemented using PLFS and includes interface modules 314-1, 314-2, 314-3, 314-4, 314-5 and 314-6 for interfacing with respective ones of the file systems 312-1, 312-2, 312-3, 312-4, 312-5 and 312-6 of the underlying physical file system 302. The virtual file system 304 communicates with the application layer of the analytics platform 305 via a PLFS PO SIX-like interface 320 and an MPI-IO interface 322, wherein MPI denotes a message passing interface.

The information processing system 300 is illustratively configurable to support both database analytics and map-reduce analytics. Exemplary database analytics and map-reduce analytics configurations are shown in FIGS. 4 and 5, respectively. It is to be appreciated that in some embodiments, a single information processing system such as system 100 or system 300 is configurable to operate in both database analytics and map-reduce analytics configurations. Accordingly, some embodiments, including some in which the virtual file system is implemented using PLFS, are configurable to run both database analytics such as those provided by GPDB and map-reduce analytics such as those provided by Hadoop on the same hardware with no significant additional software cost. Other embodiments, possibly also including other embodiments utilizing PLFS as the virtual file system, may be configured to provide only database analytics or map-reduce analytics functionality. It is also possible that analytics functionality other than database analytics and map-reduce analytics may be additionally or alternatively provided in a given embodiment.

Figure 4:
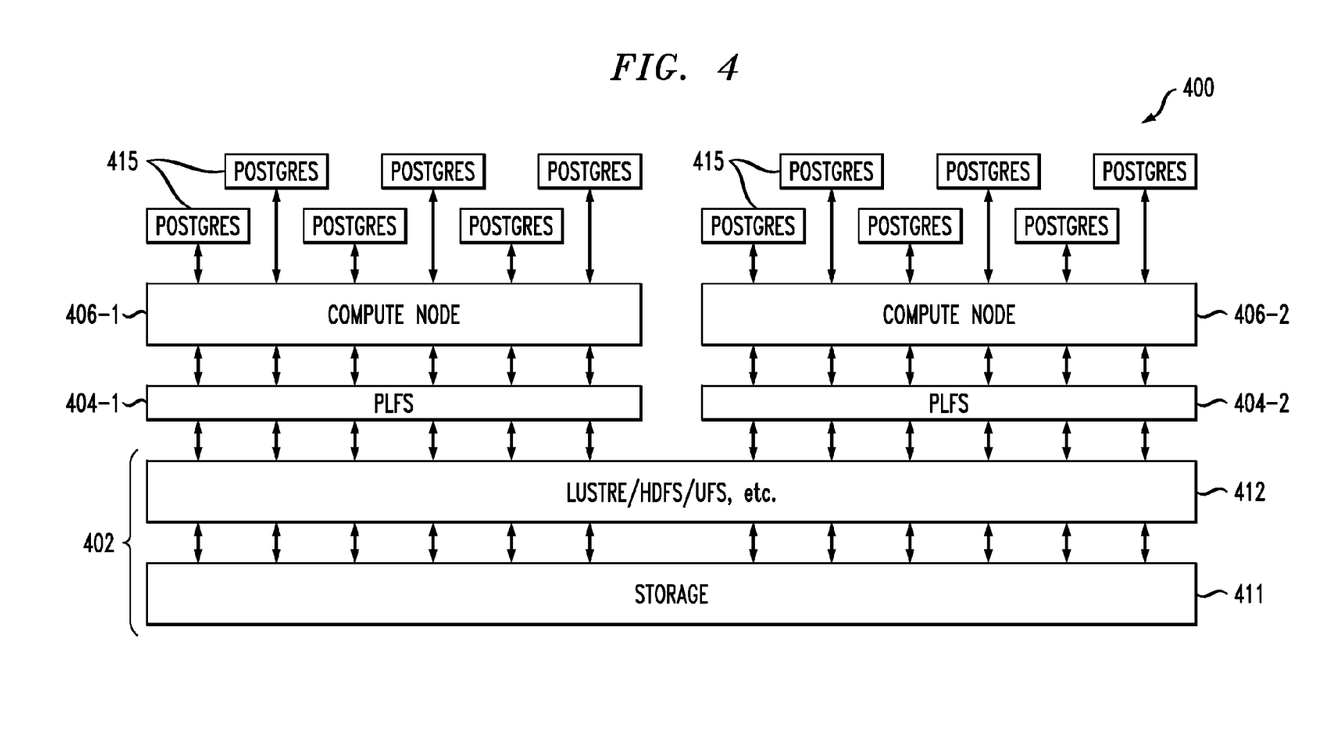

FIG. 4 shows an information processing system 400 comprising a physical file system 402, a virtual file system comprising multiple PLFS instances 404-1 and 404-2, and an analytics platform comprising compute nodes 406-1 and 406-2. The physical file system 402 comprises storage 411 and one or more associated file systems 412, such as Lustre, HDFS, Unix File System (UFS) and possibly others, that control the storage 411. The analytics platform in this embodiment is assumed to comprise a GPDB that includes multiple PostgreSQL instances 415 running on each of the compute nodes 406, where PostgreSQL is abbreviated as Postgres in the figure.

In the FIG. 4 embodiment, the virtual file system comprising PLFS instances 404-1 and 404-2 provides journaling capabilities that present an abstract storage layer to the analytics platform comprising Postgres instances 415. More particularly, PLFS as configured in this embodiment unifies all of the underlying file systems 412 to provide a single namespace for all of the Postgres instances 415. This is achieved by combining database files associated with the Postgres instances into PLFS containers or other objects that are stored by PLFS in the underlying file systems 412 utilizing the single namespace. Such an arrangement allows any underlying file system or set of file systems to be used in conjunction with the database analytics provided by the Postgres instances 415. As indicated previously, multiple storage tiers can be used in the physical file system 402, with movement between tiers being controlled by the virtual file system. For example, a flash storage tier can be used for metadata components of a given database instance and a disk storage tier for bulk data components of the database instance, in order to accelerate database access time.

The use of PLFS in the FIG. 4 embodiment provides support for additional functionality such as point-in-time queries and enhanced availability during disaster recovery. Such functionality is facilitated through global snapshots enabled by the "copy on write" architecture of PLFS. The global snapshots can be leveraged, for example, to provide point-in-time rollback and backup restoration.

The use of PLFS to implement the virtual file system also substantially increases system flexibility, by facilitating the use of cost-effective scale-out NAS clusters for at least a portion of the storage 411.

Moreover, use of PLFS ensures that the functionality of the analytics platform need not be particularly adapted for each underlying file system. This considerably simplifies the implementation of the analytics platform and protects it from version changes and other variations in the configuration of the underlying file systems. For example, the analytics platform need not include a separate driver for each underlying file system, nor is it required to explicitly understand the structure of the underlying file systems.

Figure 5:
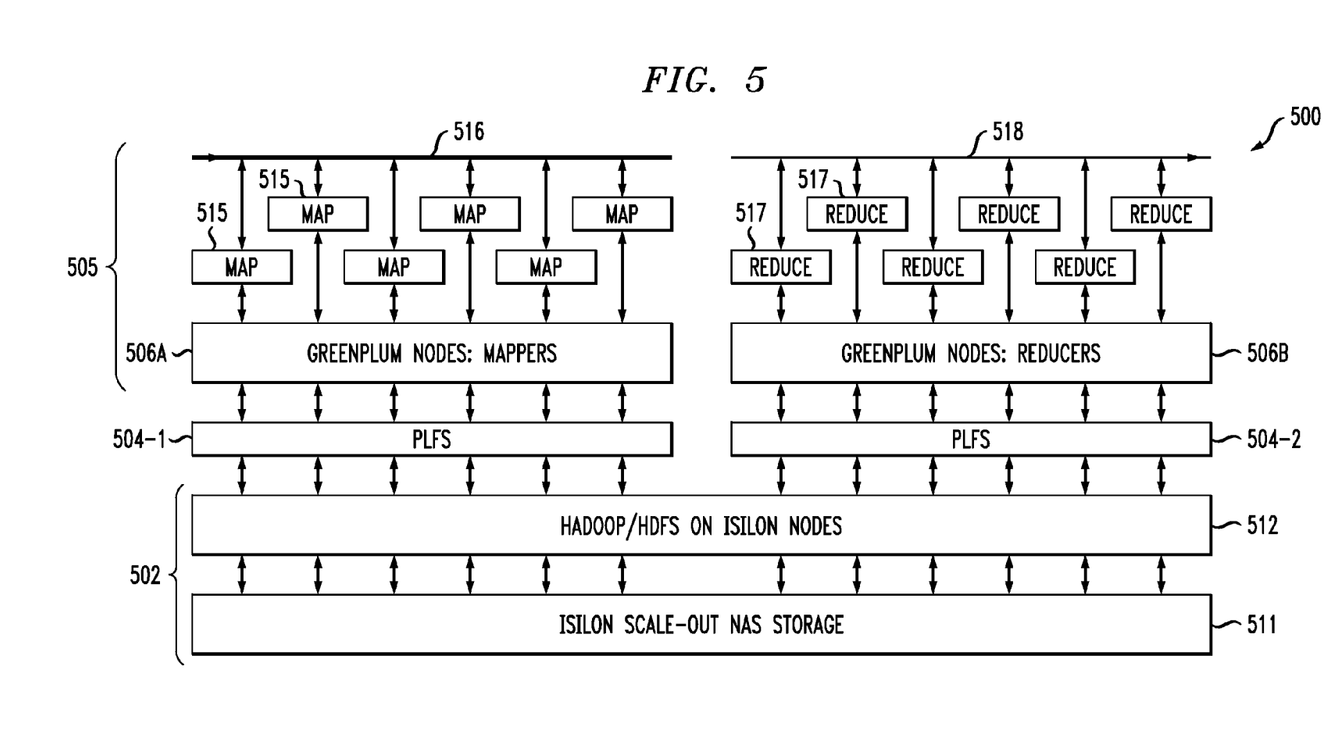

FIG. 5 shows an information processing system 500 comprising a physical file system 502, a virtual file system comprising multiple PLFS instances 504-1 and 504-2, and an analytics platform 505 comprising first and second sets of Greenplum® nodes 506A and 506B configured as mappers and reducers, respectively. The physical file system 502 comprises scale-out NAS storage 511 and one or more associated Hadoop/HDFS file systems 512. The scale-out NAS storage 511 is assumed to be implemented using a scale-out NAS cluster comprising one or more Isilon storage platforms, such as storage platforms comprising Isilon platform nodes and associated accelerators in the S-Series, X-Series and NL-Series product lines, commercially available from EMC Corporation of Hopkinton, Mass. The file systems 512 in this embodiment are assumed to run on the Isilon platform nodes and control the underlying storage 511. The analytics platform 505 in this embodiment implements map-reduce analytics utilizing map instances 515 associated with an input bus 516 and reduce instances 517 associated with an output bus 518. The map instances 515 run on the mapper nodes 506A and the reduce instances 517 run on the reducer node 506B.

Figure 6:
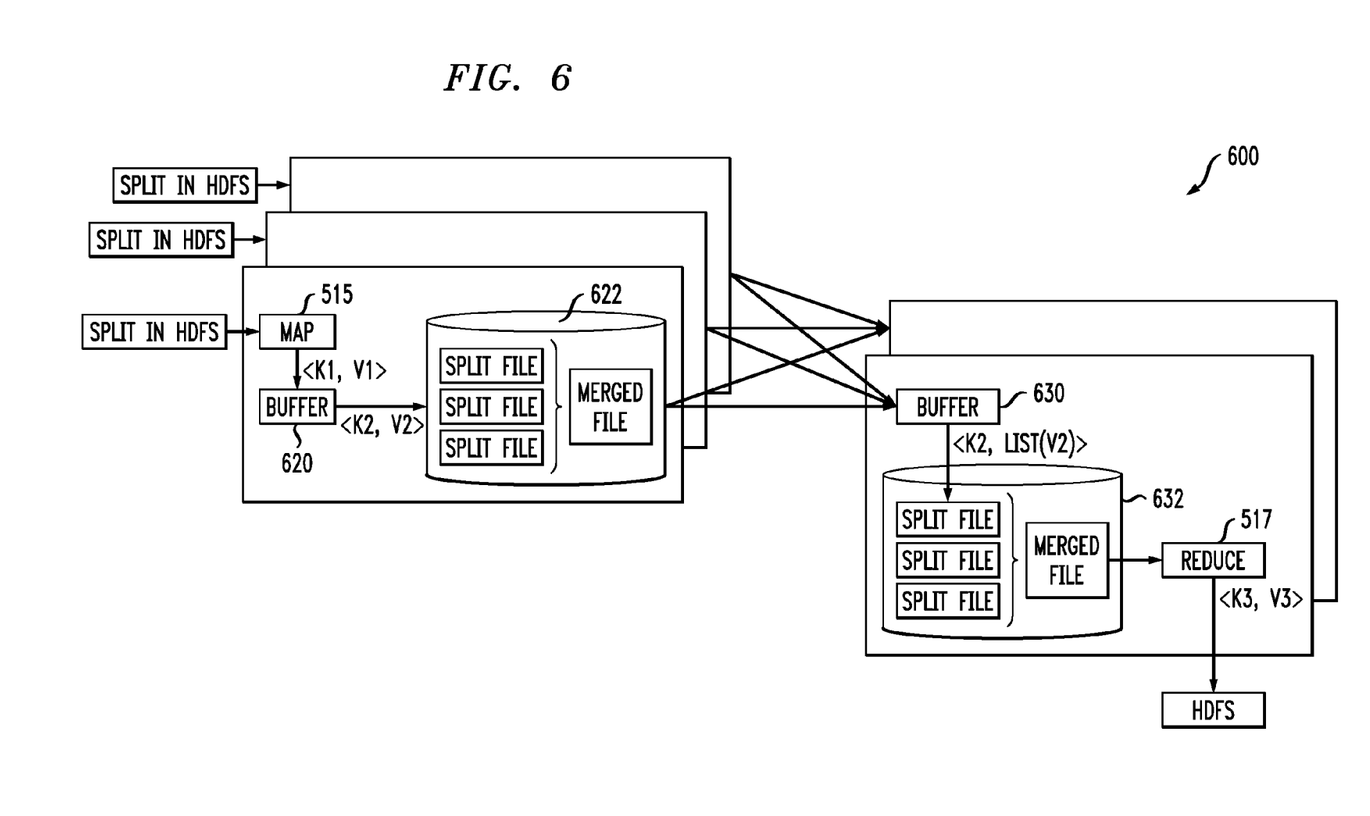
FIG. 6 illustrates exemplary map-reduce analytics functionality implemented in the information processing system of FIG. 5.

The map-reduce analytics functionality implemented in the FIG. 5 embodiment is shown in more detail in FIG. 6. The map-reduce analytics functionality 600 illustratively comprises multiple map instances 515 each associated with a key-value pair from a job input split in HDFS. A given such map instance processes an input key-value pair <K1, V1> using a buffer 620 and split and merged files 622 to generate an intermediate output comprising key-value pair <K2, V2> as illustrated. Corresponding reduce instances 517 process the intermediate outputs from the multiple map instances 515 and return the results to HDFS. More particularly, a given one of the reduce instances 517 aggregates intermediate outputs K2 using buffer 630 and processes the aggregated intermediate outputs K2 and a list of values for V2 using split and merged files 632 to generate an output key-value pair <K3, V3> that is returned to HDFS. The map-reduce analytics is generally configured to utilize a master-slave architecture in which partitioned parallel execution of mapper instances and reducer instances is controlled by a master node and executed by slave nodes.

In the FIG. 5 embodiment, the exemplary virtual file system implemented using PLFS instances 504-1 and 504-2 provides significant acceleration in the map-reduce analytics functionality of the analytics platform 505. For example, PLFS can reorganize the data in the physical file system 502 so as to ensure that the most appropriate storage tiers are utilized for map and reduce operations.

The use of PLFS in the FIG. 5 embodiment provides additional advantages similar to those described above in the context of FIG. 4. Furthermore, it allows parallel writes on file systems like HDFS that do not natively support such writes. It also provides improved data consistency for file systems with relaxed consistency such as HDFS.

It should be understood that the particular arrangements of physical file systems, virtual file systems and analytics platforms in FIGS. 3, 4 and 5 are presented by way of illustrative example only, and should not be construed as limiting in any way.

The embodiments of FIGS. 3, 4 and 5 may be viewed as exemplary arrangements in which a virtual file system is implemented using PLFS. Other virtual file systems can be used in other embodiments.

The disclosed arrangements can be used to construct a high-performance unified analytics platform using any underlying physical file system. The use of the virtual file system to provide an interface between the analytics platform and the underlying physical file system allows the compute nodes of the analytics platform to seamlessly access data files within the physical file system.

Illustrative embodiments disclosed herein also make it possible to dynamically balance the conflicting requirements of storage capacity and IO throughput, thereby avoiding situations in which either performance is less than optimal or the costs of implementing the system become excessive. Arrangements of this type can provide further acceleration of IO operations in the system 100, leading to enhanced system performance relative to conventional arrangements, while additionally or alternatively providing an ability to achieve particular levels of performance at lower cost.

It was noted above that portions of the information processing system 100 may be implemented using one or more processing platforms. Illustrative embodiments of such platforms will now be described in greater detail. Although described in the context of system 100, these platforms may also be used to implement at least portions of the information processing systems 300, 400 and 500 of FIGS. 3, 4 and 5, as well as other information processing systems in other embodiments of the invention.

Figure 7:
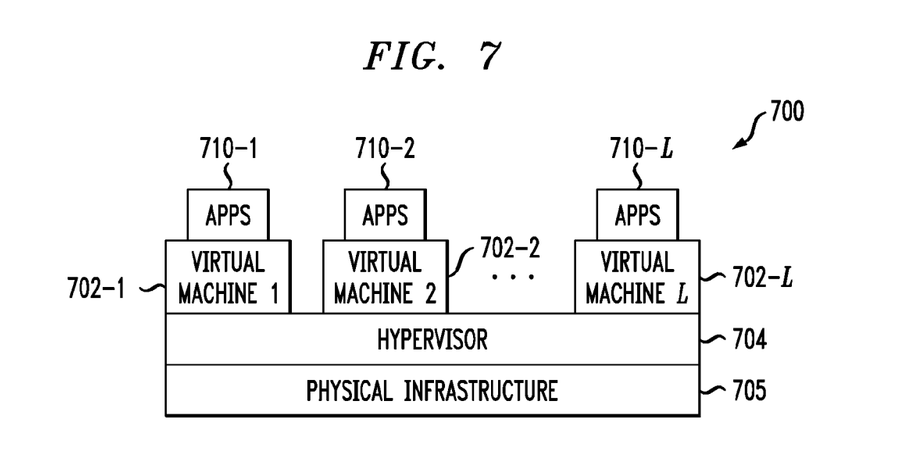
FIGS. 7 and 8 show examples of processing platforms that may be utilized to implement at least a portion of each of the information processing systems of FIGS. 1 and 3-5.
Figure 8:
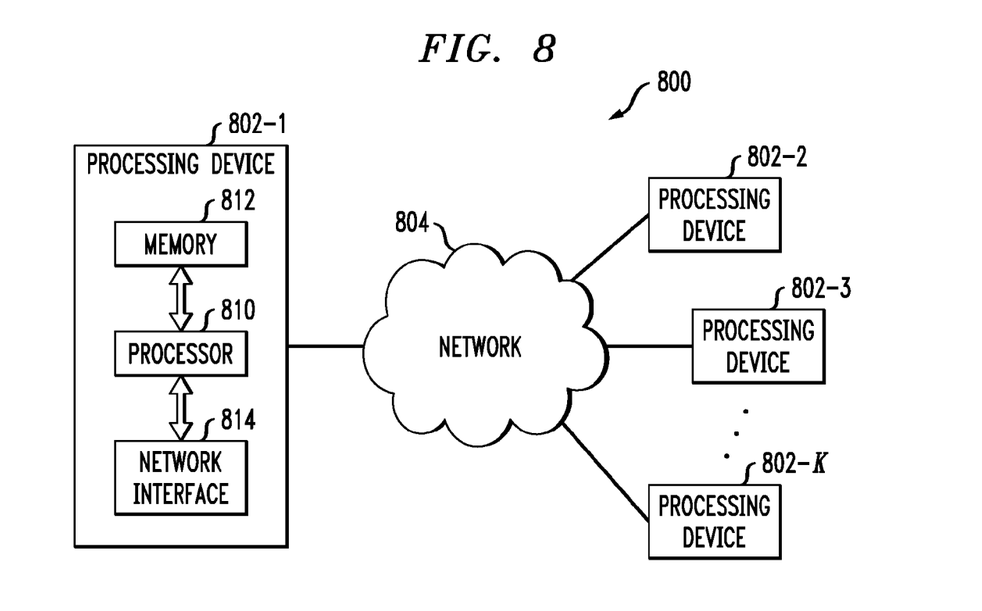

As shown in FIG. 7, portions of the information processing system 100 may comprise cloud infrastructure 700. The cloud infrastructure 700 comprises virtual machines (VMs) 702-1, 702-2, . . . 702-L implemented using a hypervisor 704. The hypervisor 704 runs on physical infrastructure 705. The cloud infrastructure 700 further comprises sets of applications 710-1, 710-2, . . . 710-L running on respective ones of the virtual machines 702-1, 702-2, . . . 702-L under the control of the hypervisor 704.

Although only a single hypervisor 704 is shown in the embodiment of FIG. 7, the system 100 may of course include multiple hypervisors each providing a set of virtual machines using at least one underlying physical machine. Different sets of virtual machines provided by one or more hypervisors may be utilized in configuring multiple instances of a burst buffer appliance or other component of the system 100.

An example of a commercially available hypervisor platform that may be used to implement hypervisor 704 and possibly other portions of the information processing system 100 in one or more embodiments of the invention is the VMware® vSphere® which may have an associated virtual infrastructure management system such as the VMware® vCenter™. The underlying physical machines may comprise one or more distributed processing platforms that include storage products, such as the above-noted VNX® and Symmetrix VMAX®. A variety of other storage products may be utilized to implement at least a portion of the system 100.

One or more of the processing modules or other components of system 100 may therefore each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-D, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA) or other type of processing circuitry, as well as portions or combinations of such circuitry elements.

The memory 822 may comprise random access memory (RAM), read-only memory (ROM) or other types of memory, in any combination. The memory 822 and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage device such as a storage disk, a storage array or an integrated circuit containing memory. The term "article of manufacture" as used herein should be understood to exclude transitory, propagating signals.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of a virtual file system or underlying physical file system as disclosed herein can be implemented at least in part in the form of one or more software programs stored in memory and executed by a processor of a processing device such as one of the virtual machines 702 or one of the processing devices 802. For example, the modules 120 and 122 of the virtual file system 104 in the FIG. 1 embodiment are illustratively implemented at least in part in the form of software.

It should again be emphasized that the above-described embodiments of the invention are presented for purposes of illustration only. Many variations and other alternative embodiments may be used. For example, the disclosed techniques are applicable to a wide variety of other types of information processing systems, virtual and physical file systems and analytics platforms. Also, the particular configurations of system and device elements shown in FIGS. 1 and 3-8 can be varied in other embodiments. Thus, for example, the particular type of virtual file system and physical file system deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
a physical file system;
a virtual file system coupled to the physical file system; and
an analytics platform comprising a plurality of compute nodes;
wherein the virtual file system is configured to control movement of data between the analytics platform and the physical file system;
wherein the analytics platform comprises a unified analytics platform operative in a first configuration to perform database analytics and operative in a second configuration to perform map-reduce analytics; and
wherein the virtual file system is implemented using at least one processing device comprising a processor coupled to a memory.

2. The apparatus of claim 1 wherein the virtual file system presents a software application programming interface to the analytics platform through which the analytics platform accesses data stored in the physical file system.

3. The apparatus of claim 1 wherein the physical file system comprises a plurality of storage tiers and the virtual file system controls movement of data between the storage tiers.

4. The apparatus of claim 3 wherein the plurality of storage tiers includes at least one tier of flash storage devices and at least one tier of disk storage devices.

5. The apparatus of claim 1 further comprising a plurality of physical file systems with the virtual file system being configured to control movement of data between the analytics platform and each of the physical file systems.

6. The apparatus of claim 5 wherein the plurality of physical file systems comprise two or more of a Lustre file system, a Hadoop Distributed File System (HDFS) and a General Parallel File System (GPFS).

7. The apparatus of claim 1 wherein the virtual file system is implemented at least in part utilizing software running on the compute nodes.

8. The apparatus of claim 1 wherein the virtual file system comprises a parallel log-structured file system (PLFS).

9. The apparatus of claim 8 wherein the PLFS comprises middleware including a plurality of synchronization daemons associated with respective storage nodes of the physical file system, and wherein a given one of the synchronization daemons is triggered by at least one of a read operation and a write operation associated with a client comprising an application running on a corresponding compute node.

10. The apparatus of claim 8 wherein the virtual file system comprises a plurality of PLFS clients running on respective ones of the compute nodes and wherein the PLFS clients are configured to control movement of data between multiple storage tiers of the physical file system in a manner that obscures said data movement from applications running on the respective compute nodes.

11. An apparatus comprising:
a physical file system;
a virtual file system coupled to the physical file system; and
an analytics platform comprising a plurality of compute nodes;
wherein the virtual file system is configured to control movement of data between the analytics platform and the physical file system;
wherein the analytics platform is configured to perform database analytics utilizing a plurality of database management system instances running on the compute nodes and the virtual file system provides a single namespace for the instances by combining database files associated with the instances into objects for storage in the physical file system utilizing the single namespace; and
wherein the virtual file system is implemented using at least one processing device comprising a processor coupled to a memory.

12. The apparatus of claim 11 wherein the objects comprise respective PLFS containers.

13. An apparatus comprising:
a physical file system;
a virtual file system coupled to the physical file system; and
an analytics platform comprising a plurality of compute nodes;
wherein the virtual file system is configured to control movement of data between the analytics platform and the physical file system;
wherein the analytics platform is configured to perform map-reduce analytics utilizing a plurality of map instances running on one or more of the compute nodes and a plurality of reduce instances running on one or more of the compute nodes and wherein the virtual file system is configured to accelerate the map-reduce analytics by controlling movement of associated data between storage tiers of the physical file system; and
wherein the virtual file system is implemented using at least one processing device comprising a processor coupled to a memory.

14. A processing platform comprising the apparatus of claim 1.

15. An information processing system comprising the apparatus of claim 1.

16. A method comprising:
configuring a virtual file system for coupling between a physical file system and an analytics platform comprising a plurality of compute nodes;
adapting the virtual file system for communication with the analytics platform;
controlling the movement of data between the analytics platform and the physical file system using the virtual file system;
configuring the analytics platform as a unified analytics platform;
operating the unified analytics platform in a first configuration to perform database analytics; and
operating the unified analytics platform in a second configuration to perform map-reduce analytics;
wherein configuring the virtual file system, adapting the virtual file system, controlling the movement of data, configuring the analytics platform and operating the unified analytics platform are implemented using at least one processing device comprising a processor coupled to a memory.

17. The method of claim 16 wherein configuring the virtual file system comprises configuring the virtual file system as a parallel log-structured file system (PLFS).

18. An article of manufacture comprising a non-transitory processor-readable storage medium having stored therein program code of one or more software programs, wherein the program code when executed by at least one processing device causes said at least one processing device:
to configure a virtual file system for coupling between a physical file system and an analytics platform comprising a plurality of compute nodes;
to adapt the virtual file system for communication with the analytics platform;
to control movement of data between the analytics platform and the physical file system using the virtual file system;
to configure the analytics platform as a unified analytics platform;
to operate the unified analytics platform in a first configuration to perform database analytics; and
to operate the unified analytics platform in a second configuration to perform map-reduce analytics.

19. The method of claim 16 wherein the unified analytics platform in the first configuration performs database analytics utilizing a plurality of database management system instances running on the compute nodes and the virtual file system provides a single namespace for the instances by combining database files associated with the instances into objects for storage in the physical file system utilizing the single namespace.

20. The method of claim 16 wherein the unified analytics platform in the second configuration performs map-reduce analytics utilizing a plurality of map instances running on one or more of the compute nodes and a plurality of reduce instances running on one or more of the compute nodes and wherein the virtual file system is configured to accelerate the map-reduce analytics by controlling movement of associated data between storage tiers of the physical file system.

* * * * *